United States Patent
Miki

(10) Patent No.: US 10,283,812 B2
(45) Date of Patent: May 7, 2019

(54) SULFIDE SOLID-STATE CELL

(71) Applicant: TOYOTA JIDOSHA KABUSHIKI KAISHA, Toyota-shi, Aichi-ken (JP)

(72) Inventor: Hidenori Miki, Hiratsuka (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 146 days.

(21) Appl. No.: 15/228,016

(22) Filed: Aug. 4, 2016

(65) Prior Publication Data

US 2017/0069930 A1     Mar. 9, 2017

(30) Foreign Application Priority Data

Sep. 8, 2015    (JP) ................ 2015-176602

(51) Int. Cl.

| | |
|---|---|
| *H01M 10/0562* | (2010.01) |
| *H01M 4/58* | (2010.01) |
| *H01M 4/62* | (2006.01) |
| *H01M 10/0525* | (2010.01) |
| *H01M 10/0585* | (2010.01) |
| *H01M 10/052* | (2010.01) |
| *H01M 4/02* | (2006.01) |
| *H01M 10/058* | (2010.01) |

(52) U.S. Cl.
CPC ..... *H01M 10/0562* (2013.01); *H01M 4/5825* (2013.01); *H01M 4/628* (2013.01); *H01M 10/052* (2013.01); *H01M 10/0525* (2013.01); *H01M 10/0585* (2013.01); *H01M 10/058* (2013.01); *H01M 2004/028* (2013.01); *H01M 2300/0068* (2013.01)

(58) Field of Classification Search
CPC ......... H01M 10/0562; H01M 10/0585; H01M 10/0525; H01M 4/5825; H01M 4/628; H01M 2004/028; H01M 2300/0068
See application file for complete search history.

(56) References Cited

U.S. PATENT DOCUMENTS

| | | |
|---|---|---|
| 2009/0068563 A1 | 3/2009 | Kanda et al. |
| 2009/0123847 A1 | 5/2009 | Okada et al. |
| 2014/0193689 A1 | 7/2014 | Takami et al. |

FOREIGN PATENT DOCUMENTS

| | | |
|---|---|---|
| JP | 2009-140911 A | 6/2009 |
| JP | 2009-176644 A | 8/2009 |
| JP | 2009-245913 A | 10/2009 |

(Continued)

*Primary Examiner* — Laura Weiner
(74) *Attorney, Agent, or Firm* — Oliff PLC

(57) ABSTRACT

A rechargeable sulfide solid-state cell. The sulfide solid-state cell may include: a cathode active material layer containing at least one kind of cathode active material selected from LiCoPO$_4$ and LiFePO$_4$; an anode active material layer; a sulfide-based solid electrolyte layer containing a sulfide-based solid electrolyte and being disposed between the cathode active material layer and the anode active material layer; and a blocking layer containing at least one kind of phosphoric acid compound with a NASICON structure, covering at least a part of the surface of the cathode active material and/or the surface of the sulfide-based solid electrolyte, being disposed between the cathode active material layer and the sulfide-based solid electrolyte layer, and being configured to prevent the cathode active material layer from contact with the sulfide-based solid electrolyte layer, the phosphoric acid compound being selected from LATP and LAGP.

2 Claims, 5 Drawing Sheets

(56) References Cited

FOREIGN PATENT DOCUMENTS

| | | |
|---|---|---|
| JP | 2010-034006 A | 2/2010 |
| JP | 2015-002052 A | 1/2015 |
| JP | 2015-032529 A | 2/2015 |
| WO | 2013/140565 A1 | 9/2013 |
| WO | 2013/161982 A1 | 10/2013 |

US 10,283,812 B2

SULFIDE SOLID-STATE CELL

TECHNICAL FIELD

The disclosure relates to a sulfide solid-state cell.

BACKGROUND

In the field of solid-state cells in which solid electrolytes are used in place of liquid electrolytes, there has been an attempt to focus on electrode active materials and solid electrolyte materials and improve the performance of solid-state cells (for example, Patent Documents 1 and 2).

An all-solid-state cell is disclosed in Patent Document 1, which uses $LiCoPO_4$ as active material.

A technique relating to sulfide-based solid electrolytes is disclosed in Patent Document 2.

Patent Document 1: Japanese Patent Application Laid-Open (JP-A) No. 2009-140911

Patent Document 2: JP-A No. 2015-032529

When $LiCoPO_4$ with an olivine structure and/or $LiFePO_4$ with an olivine structure is used as the cathode active material of a sulfide solid-state cell, there is a problem that the cell is not rechargeable.

SUMMARY

The disclosed embodiments were achieved in light of the above circumstance. An object of the disclosed embodiments is to provide a rechargeable sulfide solid-state cell.

In a first embodiment, there is provided a sulfide solid-state cell. The sulfide solid-state cell comprises: a cathode active material layer containing at least one kind of cathode active material selected from $LiCoPO_4$ and $LiFePO_4$; an anode active material layer; a sulfide-based solid electrolyte layer containing a sulfide-based solid electrolyte and being disposed between the cathode active material layer and the anode active material layer; and a blocking layer containing at least one kind of phosphoric acid compound with a NASICON structure, covering at least a part of the surface of the cathode active material and/or the surface of the sulfide-based solid electrolyte, being disposed between the cathode active material layer and the sulfide-based solid electrolyte layer, and being configured to prevent the cathode active material layer from contact with the sulfide-based solid electrolyte layer. The phosphoric acid compound is selected from $Li_xAl_yTi_z(PO_4)_3$ (where x is a number that satisfies 1≤x≤2.5; y is a number that satisfies 0<y≤1; and z is a number that satisfies 1≤z≤2.5) and $Li_xAl_yGe_z(PO_4)_3$ (where x is a number that satisfies 1≤x≤2.5; y is a number that satisfies 0<y≤1; and z is a number that satisfies 1≤z≤2.5).

The blocking layer may cover a contact surface of the cathode active material layer with the sulfide-based solid electrolyte layer.

According to the disclosed embodiments, a rechargeable sulfide solid-state cell is provided.

BRIEF DESCRIPTION OF THE DRAWINGS

In the accompanying drawings.

DETAILED DESCRIPTION

Figure 1:
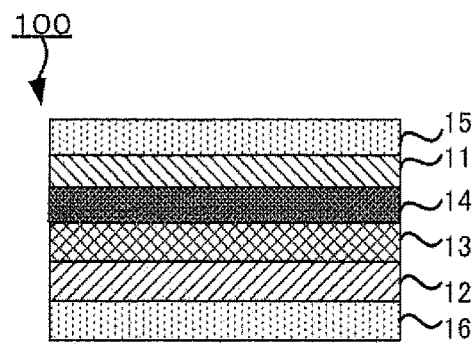
FIG. 1 is a view of an example of the sulfide solid-state cell according to an embodiment.

The sulfide solid-state cell of the disclosed embodiments comprises: a cathode active material layer containing at least one kind of cathode active material selected from $LiCoPO_4$ and $LiFePO_4$; an anode active material layer; a sulfide-based solid electrolyte layer containing a sulfide-based solid electrolyte and being disposed between the cathode active material layer and the anode active material layer; and a blocking layer containing at least one kind of phosphoric acid compound with a NASICON structure, covering at least a part of the surface of the cathode active material and/or the surface of the sulfide-based solid electrolyte, being disposed between the cathode active material layer and the sulfide-based solid electrolyte layer, and being configured to prevent the cathode active material layer from contact with the sulfide-based solid electrolyte layer, the phosphoric acid compound being selected from $Li_xAl_yTi_z(PO_4)_3$ (where x is a number that satisfies 1≤x≤2.5; y is a number that satisfies 0<y≤1; and z is a number that satisfies 1≤z≤2.5) and $Li_xAl_yGe_z(PO_4)_3$ (where x is a number that satisfies 1≤x≤2.5; y is a number that satisfies 0<y≤1; and z is a number that satisfies 1≤z≤2.5).

$LiCoPO_4$ with an olivine structure and $LiFePO_4$ with an olivine structure are active materials with high potential; therefore, from the viewpoint of chemical reactivity, their application to solid cells as a material for increasing cell energy density, is expected. However, a sulfide solid-state cell including a cathode active material layer that contains $LiCoPO_4$ and/or $LiFePO_4$ as a cathode active material, is problematic in that the cell is not rechargeable. The reason for this is considered to be because a side reaction occurs between the sulfide-based solid electrolyte and the $LiCoPO_4$ and/or $LiFePO_4$, producing a resistive layer on the surface of the $LiCoPO_4$ and/or the surface of the $LiFePO_4$ and an increase in the resistance of an interface between the cathode active material and the sulfide-based solid electrolyte. That is, it is considered that during charge and discharge, the cobalt in the $LiCoPO_4$ and the iron in the $LiFePO_4$ react with the sulfur in the sulfide-based solid electrolyte to produce a by-product.

However, it was found that the sulfide solid-state cell including the cathode active material layer that contains the $LiCoPO_4$ and/or $LiFePO_4$ as the cathode active material, can be rechargeable by disposing the blocking layer between the cathode active material layer and the sulfide-based solid electrolyte layer.

The reason for this is considered to be because the LATP and LAGP have a NASICON structure. The NASICON structure is composed of a basic unit that is composed of two octahedra and three tetrahedra, and it often includes large spaces (bottleneck) in its crystal structure. Therefore, it is presumed that due to the NASICON structure, the diffusion of the sulfur contained in the sulfide-based solid electrolyte (sulfur elimination) can be inhibited. As a result, it is considered that a chemical reaction between the sulfur and the cobalt and/or iron is inhibited, and the increase in the resistance of the interface due to the formation of the resistive layer is inhibited.

It is also considered that by use of the LATP and LAGP as a material for the blocking layer, both of which have the same $PO_4$ framework as $LiCoPO_4$ and $LiFePO_4$, unintended reactions are less likely to occur at the time of covering the surface of the cathode active material with the blocking layer in a heated condition, compared to the case of using other oxide-based solid electrolyte materials with no $PO_4$ framework (e.g., $Li_4Ti_5O_{12}$ (LTO)) as a material for the blocking layer. As a result, it is considered that at the interface between the cathode active material and the blocking layer, the production of different phases with high resistance is inhibited, and the increase in the resistance of the interface can be inhibited.

As described above, it is presumed that charge and discharge of the sulfide solid-state cell is enabled by the effect of, at the interface between the blocking layer and the sulfide-based solid electrolyte layer, inhibiting the diffusion of the sulfur contained in the sulfide-based solid electrolyte, which is an effect that is due to the NASICON structure, and the effect of inhibiting the production of different phases at the interface between the blocking layer and the cathode active material layer, which is an effect that is due to the $PO_4$ framework.

According to the disclosed embodiments, the application of cathode active materials with an olivine structure to sulfide solid-state cells is enabled and makes a significant contribution to an increase in the energy density of solid cells.

FIG. 1 is a schematic sectional view of an example of the sulfide solid-state cell according to an embodiment. The sulfide solid-state cell of the disclosed embodiments is not limited to this embodiment.

A sulfide solid-state cell 100 includes: a cathode active material layer 11 containing a cathode active material; an anode active material layer 12 containing an anode active material; a sulfide-based solid electrolyte layer 13 being disposed between the cathode active material layer 11 and the anode active material layer 12 and being in contact with the anode active material layer 12; a blocking layer 14 being disposed between the cathode active material layer 11 and the sulfide-based solid electrolyte layer 13; a cathode current collector 15 for collecting current from the cathode active material layer 11; and an anode current collector 16 for collecting current from the anode active material layer 12.

(1) Cathode Active Material Layer

The cathode active material layer is a layer containing at least one kind of cathode active material selected from at least $LiCoPO_4$ and $LiFePO_4$.

In addition to $LiCoPO_4$ and $LiFePO_4$, the cathode active material may also contain $LiMnPO_4$, $LiNiPO_4$ and solid solutions thereof. The cathode active material may be particles.

The content of the cathode active material in the cathode active material layer is not particularly limited. From the viewpoint of cell capacity, the content may be as large as possible. For example, the content of the cathode active material may be 10% by mass or more of the total mass (100% by mass) of the cathode active material layer, or it may be in a range of 20% by mass to 90% by mass.

As needed, the cathode active material layer may contain at least one of an electroconductive material and a binder.

The electroconductive material is not particularly limited, as long as it is able to increase the electroconductivity of the cathode active material layer. Examples include, but are not limited to, an electroconductive carbonaceous material.

The electroconductive carbonaceous material is not particularly limited. From the viewpoint of the area or space of reaction sites, it may be a carbonaceous material with a high specific surface area. More specifically, the electroconductive carbonaceous material may have a specific surface area of $10 \text{ m}^2/\text{g}$ or more, $100 \text{ m}^2/\text{g}$ or more, or $600 \text{ m}^2/\text{g}$ or more.

As the electroconductive carbonaceous material with a high specific surface area, examples include, but are not limited to, carbon black (such as acetylene black and Ketjen black), activated carbon and carbon fibers (such as carbon nanotubes (CNT), carbon nanofibers and vapor-grown carbon fibers).

The specific surface area of the electroconductive material may be measured by the BET method, for example.

The content of the electroconductive material in the cathode active material layer may vary depending on the type of the electroconductive material. In general, when the total mass of the cathode active material layer is 100% by mass, the content of the electroconductive material may be in a range of 1 to 30% by mass.

As the binder, examples include, but are not limited to, polyvinylidene fluoride (PVdF) and polytetrafluoroethylene (PTFE). The content of the binder in the cathode active material layer is such a content that can fix the cathode active material, etc., and it may be as small as possible. In general, when the total mass of the cathode active material layer is 100% by mass, the content of the binder may be in a range of 0 to 10% by mass.

The thickness of the cathode active material layer may vary depending on the application of the cell, etc. For example, the lower limit may be 2 nm or more, or it may be 100 nm or more. The upper limit may be 1,000 μm or less, or it may be 500 μm or less.

As needed, the sulfide solid-state cell of the disclosed embodiments includes a cathode current collector for collecting current from the cathode active material layer. The cathode current collector may be a cathode current collector with a porous or dense structure, as long as it shows desired electron conductivity. The cathode current collector may be a cathode current collector with a porous structure such as a mesh structure. As the form of the cathode current collector, examples include, but are not limited to, a foil form, a plate form and a mesh (grid) form.

As the material for the cathode current collector, examples include, but are not limited to, metal materials such as stainless-steel, nickel, aluminum, iron, titanium, copper, gold, silver and palladium, carbonaceous materials such as carbon fibers and carbon papers, and highly electron conductive ceramic materials such as titanium nitride.

The thickness of the cathode current collector is not particularly limited. For example, it may be in a range of 10 to 1,000 μm, or it may be in a range of 20 to 400 μm. An outer case to be described below may also function as the cathode current collector.

The cathode current collector may include a terminal that serves as a connection to the outside.

As the method for producing the cathode active material layer, examples include, but are not limited to, a method for roll-pressing a mixture of the cathode active material and, as needed, other components such as a binder, and a method for applying a slurry that contains the mixture and a solvent. As the solvent used for the preparation of the slurry, examples include, but are not limited to, acetone, ethanol and N-methyl-2-pyrrolidone (NMP). As the method for applying the slurry, examples include, but are not limited to, a screen printing method, a gravure printing method, a die coating method, a doctor blade method, an inkjet method, a metal mask printing method, an electrostatic coating method, a dip coating method, a spray coating method and a roller coating method. In particular, the cathode active material layer can be formed by applying the slurry to the above-described cathode current collector or a carrier film, drying the applied slurry and, as needed, roll-pressing and/or cutting the dried slurry.

(2) Blocking Layer

The blocking layer may be a layer containing at least one kind of phosphoric acid compound with a NASICON structure, covering at least a part of the surface of the cathode active material and/or the surface of the sulfide-based solid electrolyte, being disposed between the cathode active material layer and the sulfide-based solid electrolyte layer, and being configured to prevent the cathode active material layer from contact with the sulfide-based solid electrolyte layer, the phosphoric acid compound being selected from LATP ($Li_xAl_yTi_z(PO_4)_3$ where x is a number that satisfies $1 \leq x \leq 2.5$; y is a number that satisfies $0 < y \leq 1$; and z is a number that satisfies $1 \leq z \leq 2.5$) and LAGP ($Li_xAl_yGe_z(PO_4)_3$ where x is a number that satisfies $1 \leq x \leq 2.5$; y is a number that satisfies $0 < y \leq 1$; and z is a number that satisfies $1 \leq z \leq 2.5$).

A reaction between the cathode active material and the sulfide-based solid electrolyte can be inhibited by disposing the blocking layer.

The blocking layer is not particularly limited, as long as it is a layer that containing at least one kind of phosphoric acid compound with a NASICON structure, the phosphoric acid compound being selected from at least LATP and LAGP. The blocking layer may be a layer composed of LATP or LAGP. In particular, the LATP may be $Li_{1.5}Al_{0.5}Ti_{1.5}(PO_4)_3$, and the LAGP may be $Li_{1.5}Al_{0.5}Ge_{1.5}(PO_4)_3$.

The blocking layer covers at least a part of the surface of the cathode active material and/or the surface of the sulfide-based solid electrolyte. The blocking layer may cover a contact surface of the cathode active material layer with the sulfide-based solid electrolyte layer.

For the contact surface of the blocking layer with the cathode active material layer and/or the sulfide-based solid electrolyte layer, the coverage of the cathode active material layer and/or the sulfide-based solid electrolyte layer with the blocking layer may be 40% or more, may be 70% or more, or may be 90% or more.

When the cathode active material and/or the sulfide-based solid electrolyte is particles, the coverage of the cathode active material particle surface and/or the sulfide-based solid electrolyte particle surface with the blocking layer may be 40% or more, may be 70% or more, or may be 90% or more.

The coverage with the blocking layer can be qualitatively confirmed by use of a transmission electron microscope (TEM) or X-ray photoelectron spectroscopy (XPS), for example.

When the cathode active material and/or the sulfide-based solid electrolyte is particles, the diameter of the cathode active material particles and the sulfide-based solid electrolyte particles is not particularly limited. The lower limit may be 1 nm or more, may be 10 nm or more, or may be 100 nm or more. The upper limit may be 100 mm or less, may be 10 mm or less, or may be 1 mm or less.

In the disclosed embodiments, the average particle diameter of particles may be calculated by a conventional method. An example of the method for calculating the average particle diameter of particles is as follows. First, for a particle shown in an image taken by a transmission electron microscope (hereinafter referred to as TEM) or scanning electron microscope (hereinafter referred to as SEM) at an appropriate magnification (e.g., 50,000× to 1,000,000×), the particle diameter is calculated on the assumption that the particle is spherical. Such an average particle diameter calculation by TEM observation or SEM observation is conducted on 200 to 300 particles of the same type, and the average of the particles is considered as the average particle diameter.

The thickness of the blocking layer is not particularly limited. The lower limit may be 1 nm or more, may be 10 nm or more, or may be 100 nm or more. The upper limit may be 1 µm or less, may be 500 nm or less, or may be 200 nm or less.

If the thickness of the blocking layer is too large, due to the large thickness of the blocking layer, the resistance of the sulfide solid-state cell may increase. On the other hand, if the thickness of the blocking layer is too small, a reaction between the cathode active material and the sulfide-based solid electrolyte may not be sufficiently inhibited. The thickness can be obtained by image analysis using a scanning electron microscope (SEM) or transmission electron microscope (TEM).

The method for producing the blocking layer is not particularly limited. For example, the blocking layer may be produced by the following method: LATP and/or LAGP is dispersed in a dispersion medium to prepare a slurry, and the slurry is applied onto the cathode active material layer and/or the sulfide-based solid electrolyte layer, dried and roll-pressed, thereby producing the blocking layer.

The dispersion medium is the same as the dispersion medium used for the production of the cathode active material layer described above.

As the method for applying the slurry, examples include, but are not limited to, a doctor blade method, a metal mask printing method, an electrostatic coating method, a dip coating method, a spray coating method, a roller coating method, a gravure coating method and a screen printing method. Of them, an electrostatic coating method may be used.

When the cathode active material and/or the sulfide-based solid electrolyte is particles, the blocking layer may be formed on the cathode active material particle surface and/or the sulfide-based solid electrolyte particle surface, by a tumbling/fluidizing coating method (sol-gel method), a mechanofusion method, a chemical vapor deposition (CVD) method or a physical vapor deposition (PVD) method, for example.

(3) Sulfide-Based Solid Electrolyte Layer

The sulfide-based solid electrolyte layer may be a layer being disposed between the cathode active material layer and the anode active material layer and being in contact with the anode active material layer. The sulfide-based solid electrolyte layer may contain at least a sulfide-based solid electrolyte.

The sulfide-based solid electrolyte is not particularly limited, as long as it contains a sulfur element (S) and shows ion conductivity.

When the sulfide solid-state cell of the disclosed embodiments is a sulfide solid-state lithium cell, examples include, but are not limited to, $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m is a positive number; n is a positive number; and Z is any of Ge, Zn and Ga), $Li_2S$—$GeS_2$, $Li_2S$—$SiS_2$—$Li_3PO_4$, and $Li_2S$—$SiS_2$—$Li_x$-$MO_y$ (where x is a positive number; y is a positive number; and M is any of P, Si, Ge, B, Al, Ga and In). Of these electrolytes, "$Li_2S$—$P_2S_5$" means a sulfide-based solid electrolyte material composed of a raw material composition that contains $Li_2S$ and $P_2S_5$. The same applies to the others.

The sulfide-based solid electrolyte may be particles, a sulfide glass, or a crystallized sulfide glass obtained by heating the sulfide glass.

The content of the sulfide-based solid electrolyte in the sulfide-based solid electrolyte layer may be 60% by mass or more, may be 70% by mass or more, or may be 80% by mass or more, for example. The sulfide-based solid electrolyte layer may also contain a binder, or it may be composed of only the sulfide-based solid electrolyte. The binder used in the sulfide-based solid electrolyte layer is the same as the above-described cathode active material layer. The thickness of the sulfide-based solid electrolyte layer may be in a range of 0.1 μm to 1,000 μm, or it may be in a range of 0.1 μm to 300 μm, for example.

The method for producing the sulfide-based solid electrolyte layer is not particularly limited. The sulfide-based solid electrolyte layer may be produced as follows: the sulfide-based solid electrolyte is prepared in the form of a pressed powder, placed on the blocking layer or the anode active material layer and then pressurized, thereby producing a stack of the sulfide-based solid electrolyte layer and the blocking layer or the anode active material layer.

(4) Anode Active Material Layer

The anode active material layer may be a layer containing at least an anode active material. As needed, it may contain at least one of a solid electrolyte material, an electroconductive material and a binder.

Due to containing the solid electrolyte material, the anode active material layer may be an anode active material layer with high ion conductivity. The solid electrolyte material used in the anode active material layer may be the same material as the sulfide-based solid electrolyte used in the above-described sulfide-based solid electrolyte layer.

As the anode active material, examples include, but are not limited to, a metal active material and a carbon active material.

As the metal active material, examples include, but are not limited to, In, Al, Si and Sn. As the carbon active material, examples include, but are not limited to, mesocarbon microbeads (MCMB), highly-oriented pyrolytic graphite (HOPG), hard carbon and soft carbon.

The content of the anode active material in the anode active material layer may be 10% by mass or more, or it may be in a range of 20% by mass to 90% by mass, for example.

The electroconductive material and binder used in the anode active material layer are the same as the above-described cathode active material layer. The thickness of the anode active material layer may be in a range of 0.1 μm to 1,000 μm, for example.

As needed, the sulfide solid-state cell of the disclosed embodiments includes an anode current collector for collecting current from the anode active material layer. The material for the anode current collector is not particularly limited, as long as it is electroconductive. Examples include, but are not limited to, stainless-steel, nickel, copper and carbon. As the form of the anode current collector, examples include, but are not limited to, a foil form, a plate form and a mesh form. The thickness of the anode current collector is not particularly limited. For example, it may be in a range of 10 to 1,000 μm, or it may be in a range of 20 to 400 μm. The below-described outer case may also function as the anode current collector.

The anode current collector may include a terminal that serves as a connection to the outside.

The method for producing the anode active material layer is not particularly limited. For example, the anode active material layer may be produced by the following method: a mixture of the anode active material and, as needed, other components such as a binder, is dispersed in a dispersion medium to prepare a slurry, and the slurry is applied onto the anode current collector, dried and roll-pressed, thereby producing the anode active material layer.

The dispersion medium and the method for applying the slurry are the same as the above-described method for producing the cathode active material layer.

(5) Other Components

In general, the sulfide solid-state cell of the disclosed embodiments includes an outer case for housing the cathode active material layer, the anode active material layer, the sulfide-based solid electrolyte layer and so on. As the form of the outer case, examples include, but are not limited to, a coin form, a flat plate form, a cylindrical form and a laminate form.

The material for the outer case is not particularly limited, as long as it is stable to electrolytes. Examples include, but are not limited to, metals such as SUS, and resins such as polypropylene, polyethylene and acrylic resins. When the outer case is composed of a metal, only the surface of the outer case may be composed of a metal, or the whole outer case may be composed of a metal.

As the sulfide solid-state cell of the disclosed embodiments, examples include, but are not limited to, a lithium cell, a sodium cell, a magnesium cell and a calcium cell. Of them, the sulfide solid-state cell may be a lithium cell. Also, the sulfide solid-state cell of the disclosed embodiments may be a primary cell or a secondary cell. Of them, the sulfide solid-state cell of the disclosed embodiments may be a secondary cell, because it can be repeatedly charged and discharged and is useful as a cell that can be equipped in a vehicle, for example.

EXAMPLES

Example 1

[Cathode Active Material]

A solution for cathode active material was obtained by dissolving lithium ethoxide (6.25 mmol/L), cobalt nitrate (5 mmol/L) and phosphoric acid (5 mmol/L) in a mixed solvent of dehydrated ethanol and butyl carbitol mixed at a volume ratio of 1:2 (50 mL).

The solution was filled into an electrostatic spraying device and sprayed onto a Pt foil in the following conditions to form a layer:

Applied voltage: 15,000 V

Flow rate: 50 μl/min

Substrate temperature: 300° C.

Outer diameter of nozzle: 100 μm

The thus-obtained thin film was subjected to an annealing treatment at 600° C. for 5 hours in the air, thereby obtaining an $LiCoPO_4$ film.

[Formation of Blocking Layer]

A solution for blocking layer was obtained by dissolving lithium ethoxide (9.4 mmol/L), aluminum isopropoxide (2.5 mmol/L), titanium isopropoxide (7.5 mmol/L) and phosphoric acid (15 mmol/L) in a mixed solvent of dehydrated ethanol and butyl carbitol mixed at a volume ratio of 1:2 (50 mL).

The solution was filled into the electrostatic spraying device and sprayed onto the Pt foil (on which the LiCoPO$_4$ film was formed) in the following conditions to form a layer:
Applied voltage: 15,000 V
Flow rate: 50 µl/min
Substrate temperature: 200° C.
Outer diameter of nozzle: 100 µm The thus-obtained thin film was subjected to an annealing treatment at 600° C. for 5 hours in the air, thereby obtaining the LiCoPO$_4$ film covered with an LATP film (blocking layer).

[X-Ray Diffraction Measurement]

Figure 2:
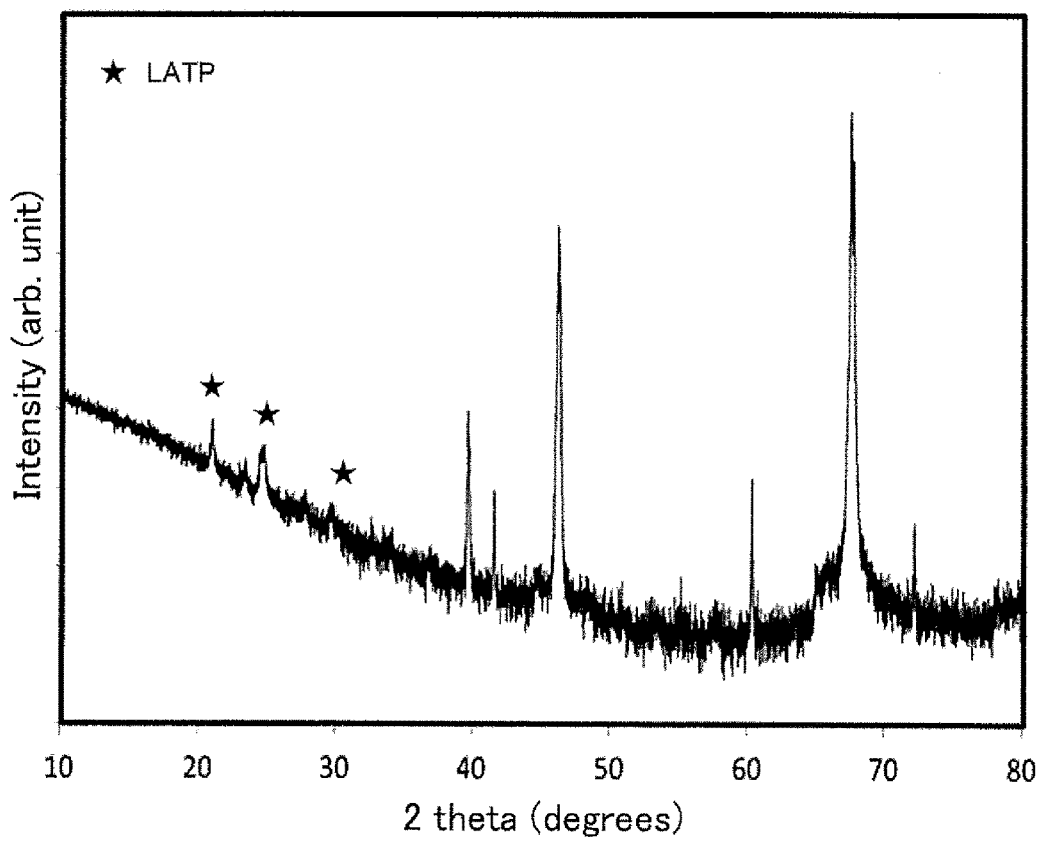
FIG. 2 is a view showing the XRD evaluation result of LATP in Example 1.

X-ray diffraction (XRD) measurement was conducted using the thus-obtained LiCoPO$_4$ film covered with the LATP film (blocking layer). The XRD measurement was conducted in an inert atmosphere. The result is shown in FIG. 2.

The XRD measurement conditions are as follows:
Device: Ultima IV (manufactured by Rigaku Corporation)
X-ray source: CuKα rays
Tube voltage–tube current: 40 kV-200 mA
Step width: 0.01 deg
Measuring rate: 1 sec/step As shown in FIG. 2, it was confirmed that in the X-ray diffraction using CuKα rays, the LATP has diffraction peaks at positions of 21°, 25° and 30° of diffraction angle 2θ. These peaks may be in a range of 0.50° (especially 0.30°, particularly) 0.10° either side of the positions of 21°, 25° and 30°, since a slight change in crystal lattice may occur due to material composition, etc.

[Anode Active Material]

In ethanol (50 mL), lithium ethoxide (15 mmol/L) and titanium tetraisopropoxide (15 mmol/L) were mixed to obtain a solution for anode active material.

The solution was filled into the electrostatic spraying device and sprayed onto a Pt foil in the following conditions to form a film:
Applied voltage: 15,000 V
Flow rate: 50 µl/min
Substrate temperature: 200° C.
Outer diameter of nozzle: 100 µm The thus-obtained thin film was subjected to an annealing treatment at 600° C. for 5 hours in the air, thereby obtaining an LTO film.

[Solid Electrolyte Material]

As a sulfide-based solid electrolyte material, 75Li$_2$S—25P$_2$S$_5$ particles were taken.

[Production of Solid-State Cell]

First, as the sulfide-based solid electrolyte layer, the 75Li$_2$S—25P$_2$S$_5$ particles was formed in the form of a pressed powder. Next, the LiCoPO$_4$ film covered with the LATP film (blocking layer) was disposed on one side of the pressed powder, and the LTO film was disposed on the other side of the pressed powder. The resulting product was subjected to flat pressing at a pressure of 4 ton/cm$^2$ (≈392 MPa) for a pressing time of one minute, thereby obtaining a laminate. For the thus-obtained laminate, the thickness of the cathode active material layer (the LiCoPO$_4$ film) was 500 nm; the thickness of the blocking layer (the LATP film) was 100 nm; the thickness of the anode active material layer (the LTO film) was 500 nm; and the thickness of the sulfide-based solid electrolyte layer (the pressed powder of the 75Li$_2$S—25P$_2$S$_5$ particles) was 300 µm. This laminate was pressed at a pressure of 2 N in the laminating direction, thereby producing a sulfide solid-state cell.

Example 2

A sulfide solid-state cell was produced in the same manner as Example 1, except that in the above "Formation of blocking layer", 7.5 mmol/L of germanium isopropoxide was used in place of the titanium isopropoxide, thereby obtaining an LiCoPO$_4$ film covered with an LAGP film.

[X-Ray Diffraction Measurement]

X-ray diffraction (XRD) measurement was conducted using the thus-obtained LiCoPO$_4$ film covered with the LAGP film. The XRD measurement was conducted in an inert atmosphere. The result is shown in FIG. 3.

The XRD measurement conditions are the same as Example 1.

Figure 3:
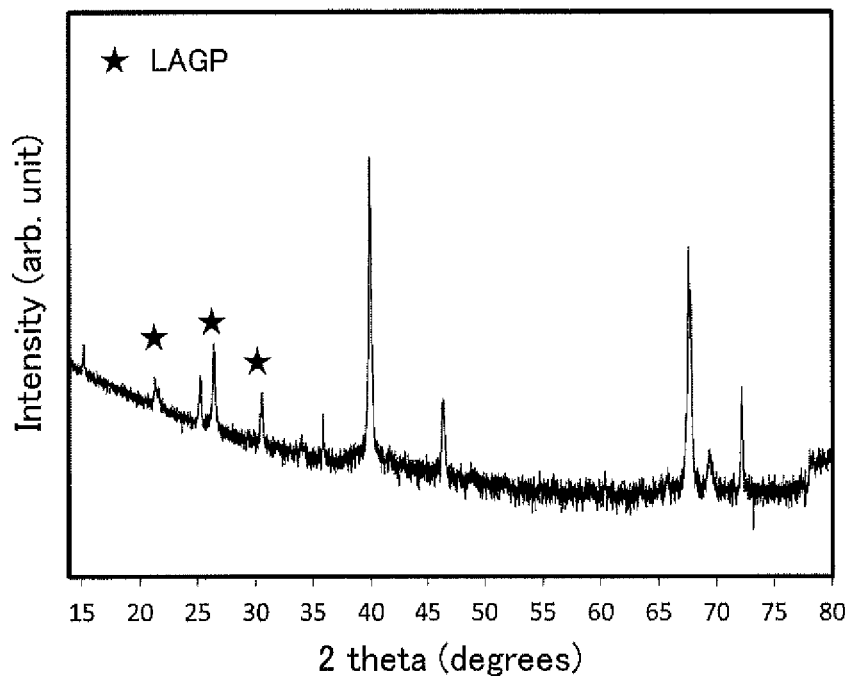
FIG. 3 is a view showing the XRD evaluation result of LAGP in Example 2.

As shown in FIG. 3, it was confirmed that in the X-ray diffraction using CuKα rays, the LAGP has diffraction peaks at positions of 21°, 25° and 30° of diffraction angle 2θ. These peaks may be in a range of 0.50° (especially 0.30°, particularly 0.10°) either side of the positions of 21°, 25° and 30°, since a slight change in crystal lattice may occur due to material composition, etc.

Example 3

A sulfide solid-state cell was produced in the same manner as Example 1, except that in the above "Cathode active material", 5 mmol/L of iron nitrate was used in place of the cobalt nitrate, and in the above "Formation of blocking layer", an LiFePO$_4$ film covered with an LATP film (blocking layer) was obtained.

Comparative Example 1

A sulfide solid-state cell was produced in the same manner as Example 1, except that the above "Formation of blocking layer" was not conducted, and an LiCoPO$_4$ film not covered with an LATP film was used as the cathode active material layer of the sulfide solid-state cell.

[CV Measurement]

Cyclic voltammetry (CV) measurement was conducted using the sulfide solid-state cells produced in Examples 1 to 3 and Comparative Example 1.

The CV measurement conditions are as follows:
Atmosphere: Ar atmosphere
Sweep rate: 0.1 mV/sec (Examples 1 and 3, Comparative Example 1), 0.5 mV/sec (Example 2)
Number of cycles: 3
Potential sweep range: a range of 2.6 to 3.5 V (vs. RHE) (Example 1), a range of 1.5 to 3.8 V (vs. RHE) (Example 2), a range of 1.0 to 2.6 V (vs. RHE) (Example 3), a range of 2.5 to 3.5 V (vs. RHE) (Comparative Example 1)

Figure 4:
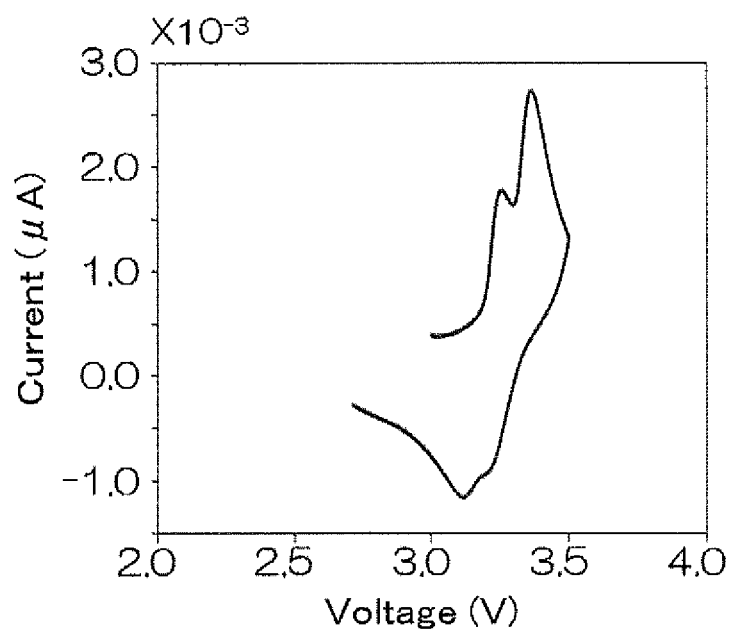
FIG. 4 is a view showing the CV evaluation result of Example 1.
Figure 5:
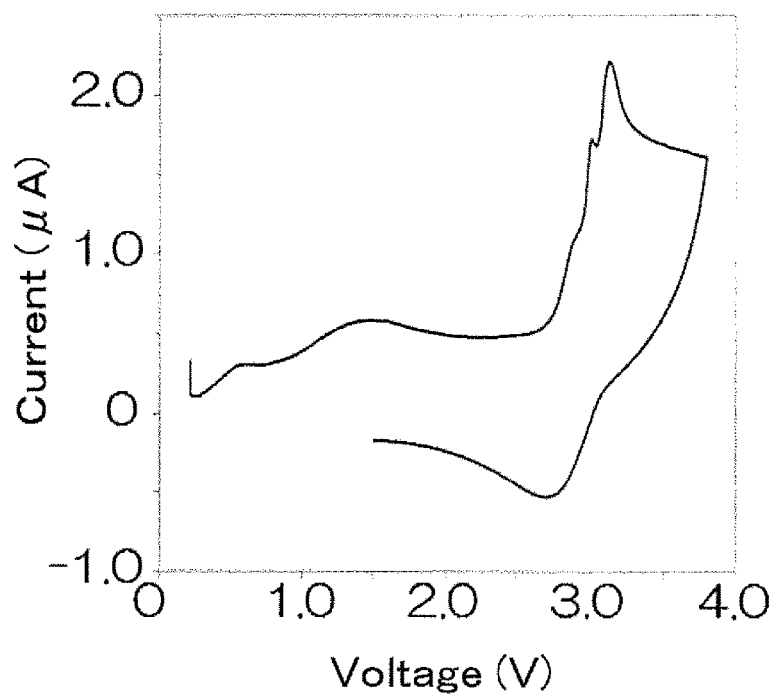
FIG. 5 is a view showing the CV evaluation result of Example 2.
Figure 6:
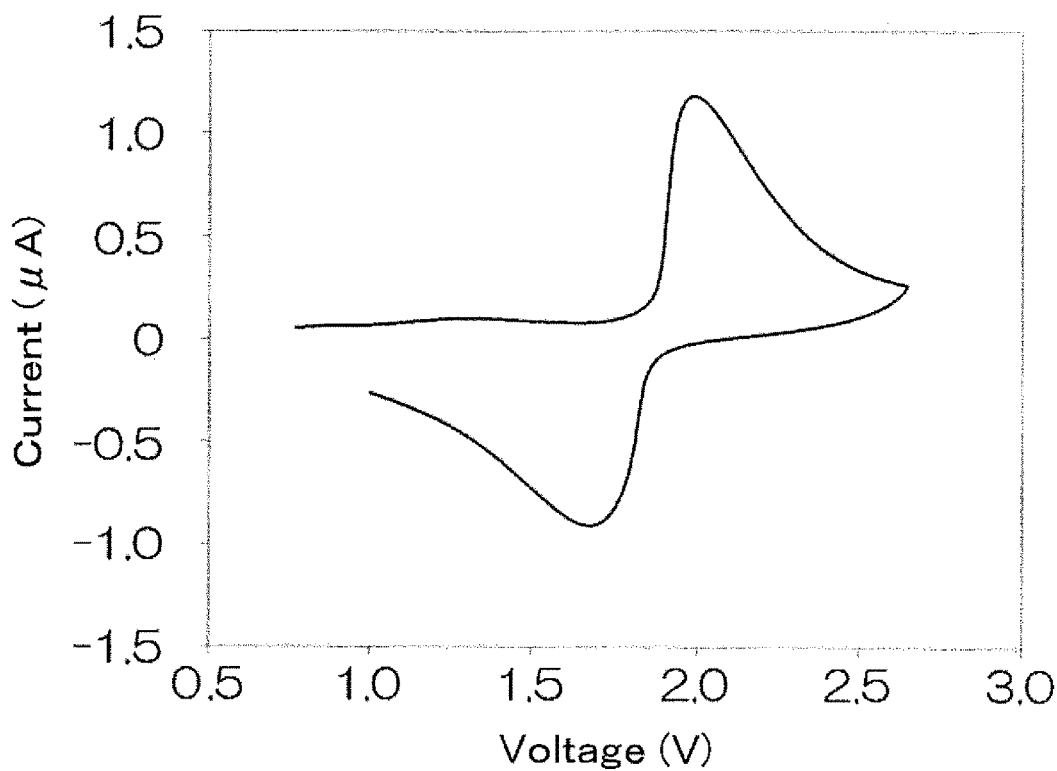
FIG. 6 is a view showing the CV evaluation result of Example 3.
Figure 7:
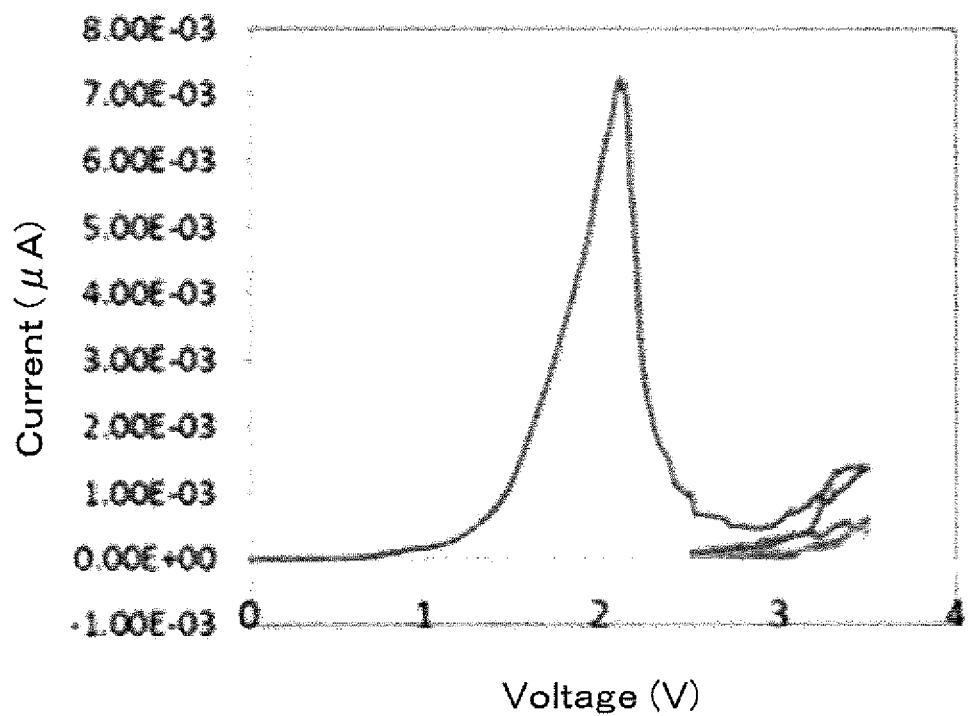
FIG. 7 is a view showing the CV evaluation result of Comparative Example 1.
Figure 8:
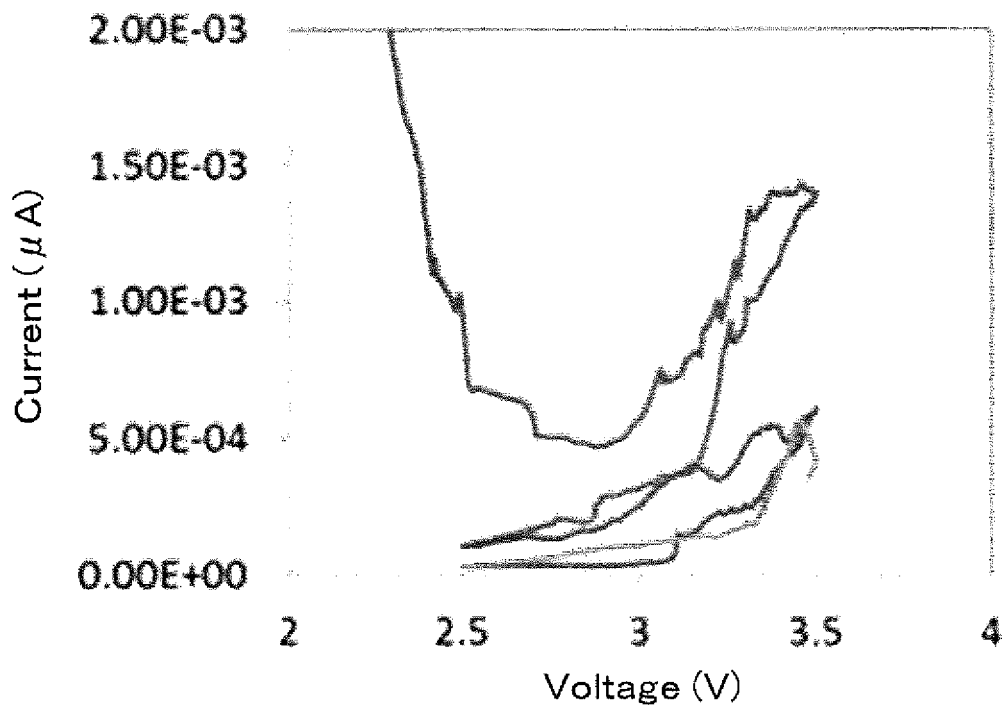
FIG. 8 is a view showing the CV evaluation result of Comparative Example 1.

The CV measurement results are shown in FIG. 4 (Example 1, potential range 2.0 to 4.0 V (vs. RHE)), FIG. 5 (Example 2, potential range 0.0 to 4.0 V (vs. RHE)), FIG. 6 (Example 3, potential range 0.5 to 3.5 V (vs. RHE)), FIG. 7 (Comparative Example 1, potential range 0.0 to 4.0 V (vs. RHE)) and FIG. 8 (Comparative Example 1, potential range 2.0 to 4.0 V (vs. RHE)).

[Charge-Discharge Test]

Figure 9:
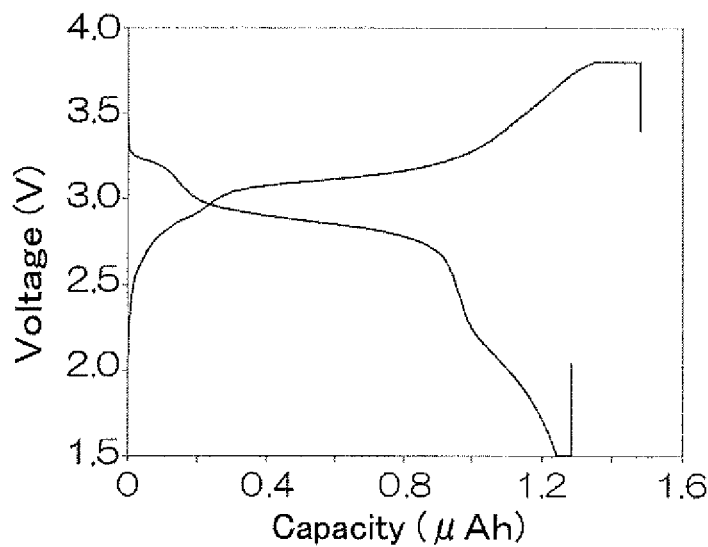
FIG. 9 is a view showing the charge-discharge results of Example 1.

Using the sulfide solid-state cells produced in Examples 1 and 2, a charge and discharge test was conducted at a charge-discharge current of 3 µA. Each cell was charged to 3.8 V (vs. RHE) and discharged to 1.5 V (vs. RHE). The results of the test are shown in FIG. 9 (Example 1) and FIG. 10 (Example 2).

As shown in FIGS. 7 and 8, for the sulfide solid-state cell of Comparative Example 1, which is a cell not including the blocking layer (LATP film), any oxidation-reduction reaction whose average voltage is around 3.2 V, was not confirmed. As shown in FIG. 7, it was confirmed that a large oxidation current flowed at around 2 V. Therefore, it is presumed that a side reaction proceeded before the potential of Li insertion/extraction in the LiCOPO$_4$, so that a charge-discharge reaction of the LiCoPO$_4$ could not be confirmed.

Meanwhile, as shown in FIG. 4, for the sulfide solid-state cell of Example 1, which is a cell including the blocking layer (LATP film), two pairs of oxidation-reduction peaks specific to LiCoPO$_4$ were confirmed. As shown in FIG. 9, it was confirmed that the sulfide solid-state cell of Example 1 charged and discharged.

Figure 10:
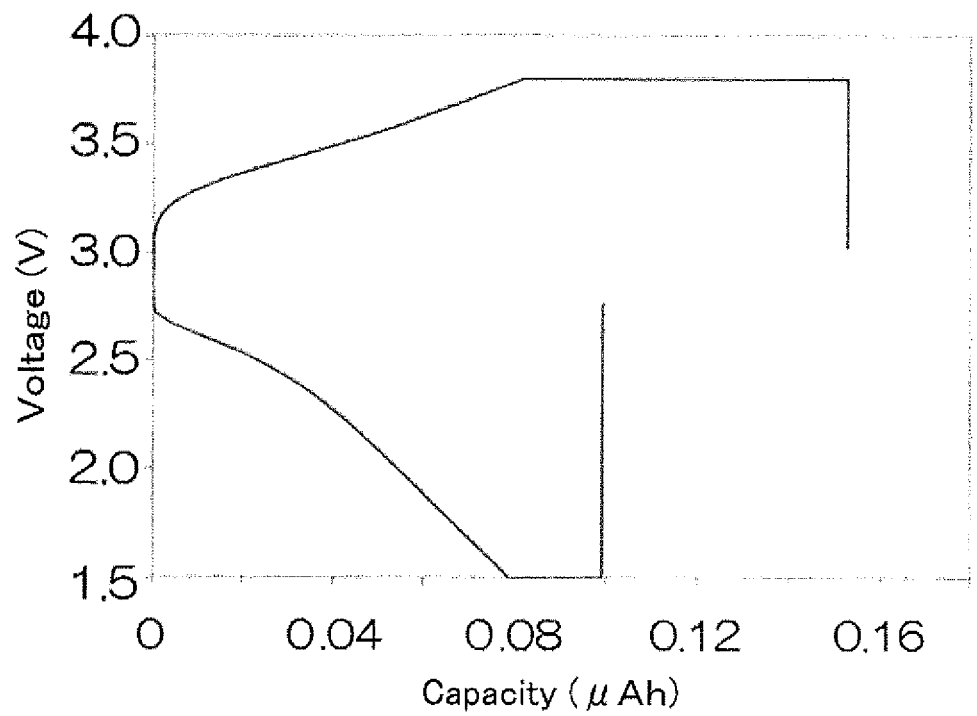
FIG. 10 is a view showing the charge-discharge results of Example 2.

As shown in FIG. 5, for the sulfide solid-state cell of Example 2, which is a cell including the blocking layer (LAGP film), oxidation-reduction peaks specific to LiCoPO$_4$ were confirmed. As shown in FIG. 10, it was confirmed that the sulfide solid-state cell of Example 2 charged and discharged.

Furthermore, as shown in FIG. 6, for the sulfide solid-state cell of Example 3, which is a cell including the blocking layer (LATP film), oxidation-reduction peaks specific to LiFePO$_4$ were confirmed. Therefore, it is presumed that the sulfide solid-state cell of Example 3 is able to charge and discharge.

It will be appreciated that the above-disclosed features and functions, or alternatives thereof, may be desirably combined into different compositions, systems or methods. Also, various alternatives, modifications, variations or improvements may be subsequently made by those skilled in the art. As such, various changes may be made without departing from the spirit and scope of this disclosure.

The invention claimed is:

1. A sulfide solid-state cell, wherein the sulfide solid-state cell comprises:
   a cathode active material layer comprising: (i) a first cathode active material selected from the group consisting of LiCoPO$_4$ and LiFePO$_4$, and (ii) a second cathode active material selected from the group consisting of LiMnPO$_4$, LiNiPO$_4$, and solid solutions thereof;
   an anode active material layer;
   a sulfide-based solid electrolyte layer containing a sulfide-based solid electrolyte and being disposed between the cathode active material layer and the anode active material layer; and
   a blocking layer containing at least one kind of phosphoric acid compound with a NASICON structure, in contact with at least a part of the surface of the cathode active material, being disposed between the cathode active material layer and the sulfide-based solid electrolyte layer, and being configured to prevent the cathode active material layer from contact with the sulfide-based solid electrolyte layer,
   the phosphoric acid compound being selected from Li$_x$Al$_y$Ti$_z$(PO$_4$)$_3$ (where x is a number that satisfies 1≤x≤2.5; y is a number that satisfies 0<y≤1; and z is a number that satisfies 1≤z≤2.5) and Li$_x$Al$_y$Ge$_z$(PO$_4$)$_3$ (where x is a number that satisfies 1≤x≤2.5; y is a number that satisfies 0<y≤1; and z is a number that satisfies 1≤z≤2.5).

2. The sulfide solid-state cell according to claim 1, wherein the blocking layer further contacts at least a part of the surface of the sulfide-based solid electrolyte layer.

* * * * *